ABBC# UNITED STATES PATENT OFFICE.

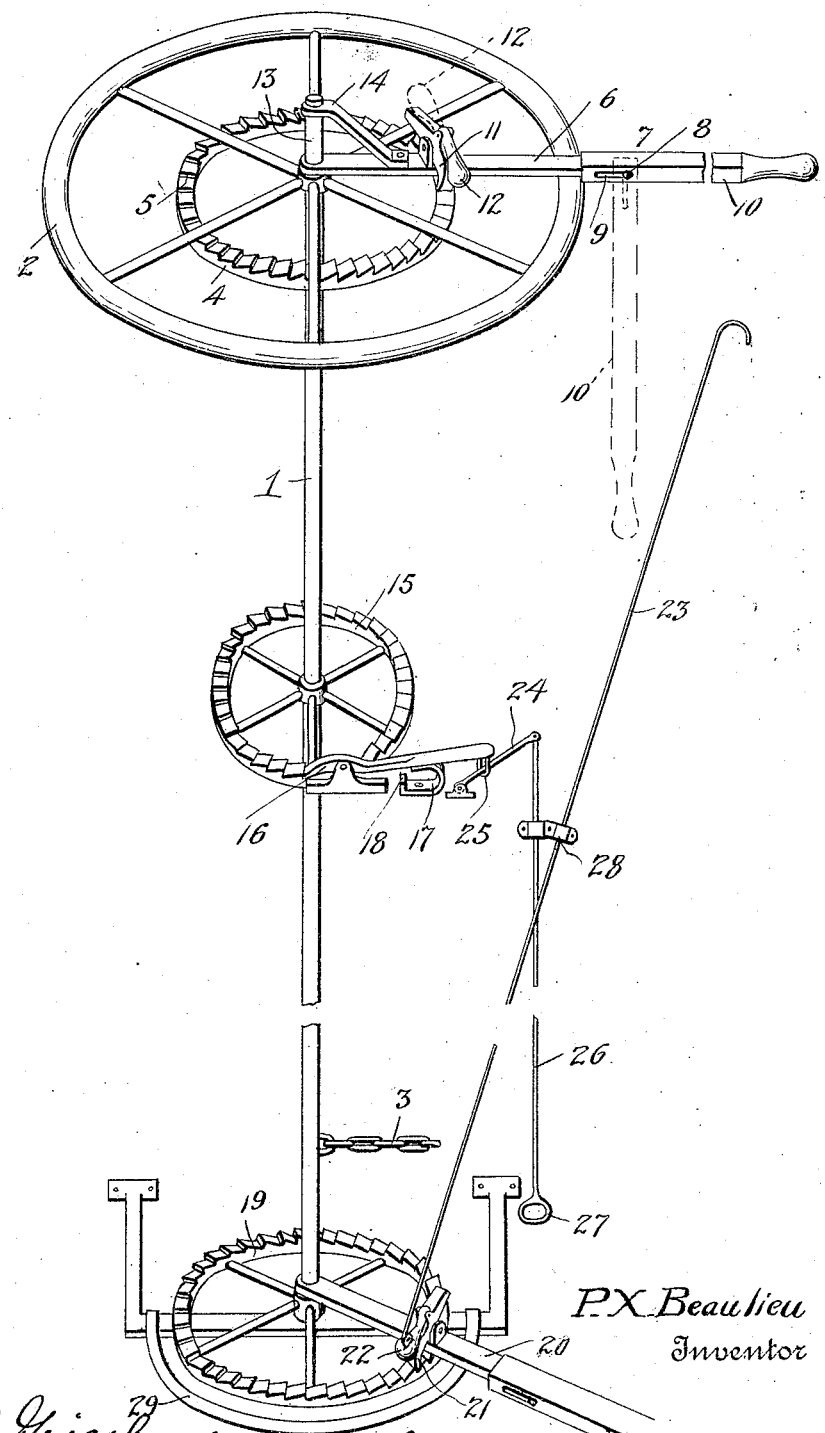

PAUL X. BEAULIEU, OF PRESQUE ISLE, MAINE.

BRAKE MECHANISM.

No. 869,157.  Specification of Letters Patent.  Patented Oct. 22, 1907.

Application filed June 10, 1907. Serial No. 378,226.

*To all whom it may concern:*

Be it known that I, PAUL X. BEAULIEU, a citizen of the United States, residing at Presque Isle, in the county of Aroostook and State of Maine, have invented certain new and useful Improvements in Brake Mechanisms; and I do declare the following to be a full, clear, and exact description of the invention, such as will enable others skilled in the art to which it appertains to make and use the same.

This invention relates to improvements in brakes.

The object of the invention is to provide a brake mechanism adapted more particularly for use upon freight cars, and the like, whereby a greater power may be exerted in setting the brakes upon the wheels of the car; and to provide means whereby the mechanism may be operated either from the top of the car or from the ground With these objects in view, the invention consists of certain novel features of construction, combination and arrangement of parts as will be more fully described and particularly pointed out in the appended claims.

In the accompanying drawing is shown a perspective view of my brake mechanism applied to the forward end of a freight car.

Referring more particularly to the drawings 1 denotes a brake shaft which is mounted in suitable brackets secured to the front end of the car and is provided on its upper end with the ordinary hand-wheel, 2, and adjacent to its lower end is connected the usual brake chain, 3.

In addition to the ordinary wheel 2 on the upper end of the shaft is mounted a smaller wheel 4, said wheel being concentric to the wheel 2, and mounted in a slightly lower plane. The wheel 4 is provided on its upper face with a series of ratchet teeth 5.

Pivotally mounted upon the shaft 1 above the wheels 4 and 2 is a handle, 6, which projects out beyond the outer wheel and is preferably jointed as shown at 7 by means of which the outer end may be permitted to depend or hang down out of the way. The joint 7 is preferably arranged at the outer edge of the wheel 2 and is in the form of a slip joint in which a pin 8 projects through a slot 9, in the outer portion 10 of the handle, which will permit of great strain being placed upon the outer end without danger of breaking the handle at the joint.

Pivotally mounted on the inner portion of the handle 6 is a pawl 11, which is adapted to engage with the teeth 5 at its free end and thereby cause the two wheels and the shaft 1 to be rotated when the handle 6 is moved back and forth by the brakeman. The handle 6 may also be turned entirely around in operating the wheel instead of being moved back and forth over the ratchet teeth, as described. A weight 12 is pivotally connected with the pawl 11 so that when it is thrown forward, the same engaging end of the pawl, said end will be caused to engage the teeth of the wheel 4, when the weight is thrown in the opposite direction over the rear end of the pawl as shown in dotted lines, the free end of the pawl will be lifted out of engagement with the teeth, thus permitting the two wheels and the shaft to rotate in the reverse direction and the brake thus released. The upper end of the shaft 1 preferably extends above the wheels and lever, as shown at 13, and a stay or brace rod 14 is connected to said upper end and extends downwardly and is connected to the handle 6, thus providing a brace for the handle, whereby the strength and rigidity of the same is greatly increased.

On the shaft 1, at a suitable distance below the operating mechanism on the upper end thereof, is mounted a ratchet wheel 15. A pawl 16 is pivotally mounted upon a suitable bracket adjacent to the wheel 15, so that the inner end of the pawl is adapted to engage the teeth of the wheel 15, and thus prevent a retrograde movement or reverse rotation of the shaft, when the lever 6 is being swung back for a new engagement of the pawl 11 with the wheel 4. The pawl 16 is preferably actuated by the foot of the operator, said pawl being forced downwardly against the tension of a spring 17 to release the same from engagement with the teeth of the wheel 15. If desired, a stop 18 may be provided for the end of the lever by bending up one end of the spring, 17, toward the other, as shown in the drawing.

In addition to the shaft operating mechanism on the upper end of the shaft I have provided means whereby the brakes may be operated from the ground, thus saving the time and labor of the brakeman in climbing to the top of a car when the brakes are to be operated. The mechanism for operating the brake from the ground comprises a ratchet wheel 19, which is rigidly mounted on the lower end of the shaft 1 and is similar in construction to the ratchet wheel 5 mounted on the shaft below the hand-wheel, 2. On the shaft 1, a slight distance above the ratchet wheel 19 is pivotally mounted a handle 20, which is preferably jointed in the same manner as the handle 6 on the upper end of the shaft to permit the outer end of the handle to drop or hang down when not in use. On the handle 20 is pivotally mounted a pawl 21, one end of which is adapted to engage the teeth of the ratchet wheel 19, whereby the latter may be turned in one direction by the handle 20. A weight 22 is pivotally mounted on the handle and is adapted to be swung into engagement with the working end of the pawl to hold the same in engagement with the teeth of the ratchet wheel or to be swung back into engagement with the opposite end of the pawl to hold the same out of engagement with said teeth, thus permitting the wheel 19 and shaft to turn in a reverse direction. The weight 22 has connected thereto the lower end of an operating rod 23, the upper end of which extends to the top of the car and is provided with a handle to permit the same to be grasped and operated by the brakeman when on the top of the car, thus enabling him to release the brake mechanism without descending to the ground.

In order that the pawl 16 may be disengaged from the shaft locking wheel 15, by a brakeman on the ground, I provide a lever 24 which is pivotally mounted in a suitable bracket on the top of the car, and is slidably engaged with a loop or eye 25 formed on the inner end of the pawl 16. To the outer end of the lever 24 is connected the upper end of an operating rod 26 which extends downwardly to near the bottom of the car and is provided with a handle 27, whereby the brakeman on the ground may reach the same, and, by pulling downwardly on said rod 26, will cause the lever 24 to release the pawl 16 from the wheel 15, thus allowing the shaft to turn in a reverse direction to release the brakes. The operating rods 23 and 26 are held in operative position by means of suitable guide brackets 28, secured to the end of the car. The outer portion of the handle 20 is preferably supported upon a segmental guide bar 29, which is secured to the lower supporting bracket of the shaft.

Having described my invention, I claim:

1. In a brake mechanism, and shaft provided at its upper end with a hand wheel and just below said hand wheel with a ratchet, a handle pivotally mounted on said shaft, just above said hand wheel and adapted for convenient manipulation at the top of the car and carrying a weight equipped pawl for engagement with said ratchet, said shaft having at its lower end an additional ratchet wheel and a like handle also loosely connected to said shaft and provided with a weight-equipped pawl for engagement with said latter ratchet wheel, a third ratchet wheel secured to said shaft intermediate of the aforesaid ratchet wheels, a spring-pressed pawl engaging said intermediate ratchet wheel for retention against reverse movement, a handle-equipped lever connected to said intermediate ratchet-engaging pawl, and a handle-rod connected to, and adapted for actuating the bottom ratchet-engaging pawl, said intermediate ratchet-engaging pawl having the handle of its operating lever passing through a bracket common to said handle rod, said handle extending downward for convenient actuation from the ground and said handle rod extending upwardly for manipulation near the top of the car.

2. In a brake mechanism, a shaft provided at its upper end with two wheels, one of which is adapted to be actuated by hand, ratchet teeth on the other wheel, a handle pivotally mounted on said shaft adjacent to said wheels, and extending beyond the rim thereof, a pawl mechanism on said handle in position to engage the ratchet teeth of said wheel, whereby the shaft may be rotated from the top of a car, a ratchet wheel fixedly mounted on the lower end of said shaft, an operating handle pivotally mounted above said wheel, and a pawl mechanism carried by said handle to engage the teeth of said ratchet wheel.

3. In a brake mechanism for cars, a shaft, a hand-wheel rigidly mounted on the upper end of said shaft, a ratchet wheel rigidly mounted on the shaft below said hand-wheel, an operating lever or handle pivotally mounted on the shaft above said hand-wheel, a pawl mechanism carried by said handle or lever and adapted to be held in and out of engagement with the teeth of said ratchet wheel, a shaft locking ratchet wheel, a pawl adapted to engage said wheel, means to operate said pawl from the ground, a pawl and ratchet mechanism mounted on the lower end of said shaft, and means to release the pawl of said operating mechanism from the top of a car.

4. In a brake mechanism for cars, a shaft, a hand-wheel rigidly mounted on the upper end of said shaft, a ratchet wheel rigidly mounted on the shaft below said hand-wheel, an operating lever or handle pivotally mounted on the shaft above said hand-wheel, a pawl mechanism carried by said handle or lever and adapted to be held in and out of engagement with the teeth of said ratchet wheel, a shaft locking ratchet wheel, a pawl adapted to engage said wheel, a releasing lever connected to said pawl, an operating pawl connected to said lever whereby the same is operated from the ground, a ratchet wheel mounted on the lower end of said shaft, a jointed operating handle pivotally mounted on said shaft, a pawl pivotally mounted on said handle, means to hold said pawl into and out of engagement with the teeth of said ratchet wheel and an operating rod connected to said pawl holding means whereby the same may be actuated from the top of a car.

In testimony whereof I have hereunto set my hand in presence of two subscribing witnesses.

PAUL X. BEAULIEU.

Witnesses:
JOHN H. JUDD,
ALFRED BEAULIEU.